UNITED STATES PATENT OFFICE.

WILLIAM LENNARD-FOOTE, OF BROOKLYN, NEW YORK.

PAINT.

SPECIFICATION forming part of Letters Patent No. 705,938, dated July 29, 1902.

Application filed October 28, 1901. Serial No. 80,217. (No specimens.)

*To all whom it may concern:*

Be it known that I, WILLIAM LENNARD-FOOTE, a citizen of the United States, and a resident of Brooklyn, New York city, in the county of Kings and State of New York, have invented certain new and useful Composition of Matter, of which the following is a specification.

My invention relates to paints, and especially to such paints as are intended to be applied to metals, wood, and other substances and to form thereon a protective and preservative coating which shall be waterproof, fireproof, and acid-proof.

The invention consists in a composition of matter or combination of substances, as hereinafter more particularly set forth.

In carrying my invention into effect and making the improved paint herein described I prefer to use the following formula, which, however, may be somewhat modified, as hereinafter explained: one part pure talc, (hydrated magnesium silicate,) two parts kaolin, (hydrated silicate of alumina,) three parts silex, two parts corundum, three-fourths part rubber, (dissolved in any suitable menstrum,) four parts zinc oxid, one and one-half parts hydrofluoric acid, (diluted with eight parts of water,) one-half part saturated aqueous solution of alum, sufficient of a mixture of equal parts of silicate of potassium and of silicate of soda to bring the paint to a suitable thickness and consistency.

The ingredients above named should be thoroughly and intimately mixed and incorporated together until the resulting composition forms a smooth paint of a consistence adapted to flow easily from a brush.

The ingredients above specified are not all essential to the formation of a paint embodying my invention. The principal function of the corundum is to increase the hardness of the coat of paint and can be dispensed with when great hardness is not essential. The principal function of the alum is to promote, in coöperation with the hydrofluoric acid, the setting of the mixture, and therefore alum is not a necessary ingredient, though I consider it desirable. Neither are both the silicates of potassium and soda essential. These substances being to a large extent chemical equivalents one alone would give good results in a paint made according to my invention; but as they are not full equivalents I get better results by using a mixture of both silicates in equal parts as the last ingredient of my composition. Should only one of these silicates be used, I have found somewhat better results from using the soda silicate than from the potassium silicate.

The proportions of the various ingredients herein specified are those which I have found most satisfactory. I do not confine myself, however, to the particular proportions mentioned, but may vary the same more or less, according to circumstances.

Having thus described my invention, what I claim as new, and desire to secure by Letters Patent, is as follows:

1. A composition of matter, consisting of talc, kaolin, silex, dissolved rubber, zinc oxid, diluted hydrofluoric acid, and silicate of soda.

2. A composition of matter, consisting of talc, kaolin, silex, corundum, dissolved rubber, zinc oxid, diluted hydrofluoric acid, and silicate of soda.

3. A composition of matter, consisting of talc, kaolin, silex, dissolved rubber, zinc oxid, an aqueous solution of alum, diluted hydrofluoric acid, and silicate of soda.

4. A composition of matter, consisting of talc, kaolin, silex, corundum, rubber in solution, zinc oxid, diluted hydrofluoric acid, alum in aqueous solution, silicate of potassium, and silicate of soda.

5. A composition of matter, consisting of one part talc, two parts kaolin, three parts silex, two parts corundum, three-fourths part rubber in solution, four parts zinc oxid, one and one-half parts diluted hydrofluoric acid, one-half part alum in aqueous solution, and sufficient silicate of soda to make the composition of a suitable paint-like consistency.

6. A composition of matter, consisting of one part talc, two parts kaolin, three parts silex, two parts corundum, three-fourths part rubber in solution, four parts zinc oxid, one and one-half parts diluted hydrofluoric acid, one-half part alum in aqueous solution, and sufficient of a mixture of equal parts of silicate of potassium and silicate of soda to make the composition of a suitable paint-like consistency.

Signed at New York city, in the county of New York and State of New York, this 26th day of October, A. D. 1901.

WILLIAM LENNARD-FOOTE.

Witnesses:
EDMOND COUGAR BROWN,
WM. N. MACLEAN.